(12) United States Patent
Goudeau et al.

(10) Patent No.: US 8,820,788 B2
(45) Date of Patent: Sep. 2, 2014

(54) OCCUPANT RESTRAINT SYSTEM

(75) Inventors: Darren W. Goudeau, Rochester Hills, MI (US); Jonathon M. Boughner, St. Auburn Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 478 days.

(21) Appl. No.: 13/103,941

(22) Filed: May 9, 2011

(65) Prior Publication Data

US 2012/0286501 A1 Nov. 15, 2012

(51) Int. Cl.
*B60R 22/38* (2006.01)
*B60R 22/42* (2006.01)
*B60R 22/44* (2006.01)

(52) U.S. Cl.
USPC .......................................... 280/806; 296/480

(58) Field of Classification Search
USPC ............... 280/801.1, 806, 808, 807; 297/468, 297/469, 474, 480; 24/265, 170
See application file for complete search history.

(56) References Cited

U.S. PATENT DOCUMENTS

| | | | |
|---|---|---|---|
| 2,998,625 A | 9/1961 | Huber | |
| 5,058,244 A * | 10/1991 | Fernandez | 24/170 |
| 5,100,176 A * | 3/1992 | Ball et al. | 280/801.1 |
| 5,806,148 A | 9/1998 | McFalls et al. | |
| 5,870,816 A | 2/1999 | McFalls et al. | |
| 6,708,380 B2 * | 3/2004 | Schneider et al. | 24/633 |
| 7,010,836 B2 * | 3/2006 | Acton et al. | 24/265 BC |
| 7,185,919 B2 * | 3/2007 | Mather et al. | 280/808 |
| 8,079,616 B2 * | 12/2011 | Higuchi et al. | 280/806 |
| 8,460,145 B2 * | 6/2013 | Mitsuhashi | 475/162 |
| 2004/0158955 A1 * | 8/2004 | Acton et al. | 24/265 BC |
| 2008/0130419 A1 * | 6/2008 | Watanabe et al. | 368/37 |
| 2012/0068520 A1 * | 3/2012 | McFalls et al. | 297/468 |
| 2012/0286501 A1 * | 11/2012 | Goudeau et al. | 280/801.1 |

FOREIGN PATENT DOCUMENTS

JP 8-080803 A 3/1996

OTHER PUBLICATIONS

International Search Report and Written Opinion issued for PCT/US2012/036345; Nov. 28, 2012; 9 pages.

* cited by examiner

*Primary Examiner* — Karen Beck
(74) *Attorney, Agent, or Firm* — Foley & Lardner LLP

(57) ABSTRACT

A tongue assembly for use in an occupant restraint system also having a buckle mechanism and a webbing. The tongue assembly includes a tongue member configured to selectively engage the buckle mechanism, a body formed over a portion of the tongue member, a cam, and a biasing member configured to rotationally bias the cam. The body includes a contact surface. The cam includes a cam surface and is configured to rotate about an axis of rotation between a first locking position and a second free position. When the cam is positioned in the second free position the tongue assembly is free to slide along the length of the webbing, and when the cam is positioned in the first locking position a portion of the webbing is clamped between the cam surface and the contact surface thereby preventing the tongue assembly from sliding along the length of the webbing.

17 Claims, 5 Drawing Sheets

OCCUPANT RESTRAINT SYSTEM

BACKGROUND

The present application relates generally to the field of occupant restraint systems for use in vehicles to provide restraint to vehicle occupants. More specifically, this application relates to an occupant restraint system (e.g., seatbelt assembly) having a tongue assembly that includes a cam and is configured to provide selective clamping to the seatbelt webbing.

SUMMARY

According to a disclosed embodiment, a tongue assembly for use in an occupant restraint system of a vehicle, the occupant restraint system also having a buckle mechanism and a webbing, is provided. The tongue assembly includes a tongue member having an opening and configured to selectively engage the buckle mechanism of the occupant restraint system; a body formed over a portion of the tongue member, wherein the body includes a contact surface, a first wall, and a second wall opposing the first wall; a can provided between the first and second walls of the body, and configured to rotate about an axis of rotation between a first locking position and a second free position, wherein the cam includes a cam surface; and a biasing member configured to rotationally bias the cam. When the cam is positioned in the second free position the tongue assembly is free to slide along the length of the webbing of the occupant restraint system, and when the cam is positioned in the first locking position a portion of the webbing is clamped between the cam surface of the cam and the contact surface of the body thereby preventing the tongue assembly from sliding along the length of the webbing. The cam surface of the cam may be configured as an Archimedes spiral.

The first wall may include a bore and the second wall may include a bore opposing the bore in the first wall. The tongue assembly may also include a fixed pin having a first end configured to engage the bore in the first wall, such that the fixed pin is prohibited from rotating relative to the body, and a second end configured to receive a portion of the biasing member. The tongue assembly may also include a pivot pin having a first end configured to receive a portion of the biasing member, and a second end configured to engage the bore in the second wall, such that the pivot pin is free to rotate relative to the body. The biasing member may be configured to engage the first end of the pivot pin and the second end of the fixed pin, thereby imparting energy in torsion between the fixed and pivot pins. The cam may include an opening configured to receive at least a portion of the fixed pin, the pivot pin and the biasing member.

The pivot pin may include an anti-rotation feature that prohibits relative rotation between the cam and the pivot pin, thereby enabling the cam and pivot pin to rotate together about the axis of rotation. The first end of the fixed pin may include an anti-rotation feature to prohibit the fixed pin from rotating relative to the body. The body may include a stop configured to limit the rotational travel of the cam. The body may also include a rear wall that extends between the two opposing walls, thereby forming a gap between the rear wall and the body to allow a portion of the webbing to pass therein.

The first wall may include a bore and the second wall may include an opening opposing the bore in the first wall. The opening in the second wall of the body may be configured to allow the fixed pin, biasing member, and/or the pivot pin to pass therethrough. The tongue assembly may further include a cap that is configured to prevent the fixed pin, biasing member, and/or the pivot pin from passing back through the opening in the second wall.

According to another disclosed embodiment, a cam for use within a tongue assembly of an occupant restraint system for a vehicle is provided. The occupant restraint also includes a buckle mechanism and a webbing, the tongue assembly being configured to selectively engage the buckle mechanism, and the tongue assembly also being configured to selectively clamp the webbing thereby to prevent the tongue assembly from sliding along the length of the webbing. The cam includes a cam surface for contacting the webbing to selectively clamp the webbing to the tongue assembly to prevent the tongue assembly from sliding along the length of the webbing; and an axis of rotation, about which the cam rotates relative to the tongue assembly in order to selectively clamp the webbing. The cam surface of the cam may be configured as an Archimedes spiral.

According to another disclosed embodiment, an occupant restraint system configured to selectively restrain a seated occupant of a vehicle, is provided. The occupant restraint system includes a webbing having a first end connected to an anchor, and a second end; a buckle mechanism having an opening and a release; and a tongue assembly configured to selectively slide along the length of the webbing between the first and second ends of the webbing. The tongue assembly includes a latch plate configured to pass through the opening of the buckle mechanism to selectively engage the buckle mechanism, thereby locking the tongue assembly to the buckle mechanism, whereupon activation of the release of the buckle mechanism releases the latch plate thereby disengaging the tongue assembly from the buckle mechanism. The tongue assembly also includes a cam configured to rotate about an axis of rotation to selectively clamp a portion of the webbing between the cam and the tongue assembly, thereby preventing the tongue assembly from sliding along the length of the webbing.

The second end of the webbing may be retractably connected to a retractor mechanism configured to pretension the webbing. The tongue assembly may also include a pivot pin configured to engage the cam, whereby the cam and pivot pin rotate together relative to the tongue assembly. The tongue assembly may also include a biasing member to provide energy in torsion to rotate the cam and pivot pin. The tongue assembly may also include a body formed over a portion of the latch plate, the body having a first wall with a bore and a second opposing wall with a bore, whereby a portion of the pivot pin engages the bore in the second wall. The tongue assembly may also include a fixed pin configured to engage the bore in the first wall of the body, wherein the cam rotates relative to the fixed pin. The cam may include an opening configured to receive at least a portion of the fixed pin, the pivot pin, and the biasing member.

DETAILED DESCRIPTION

Figure 1:
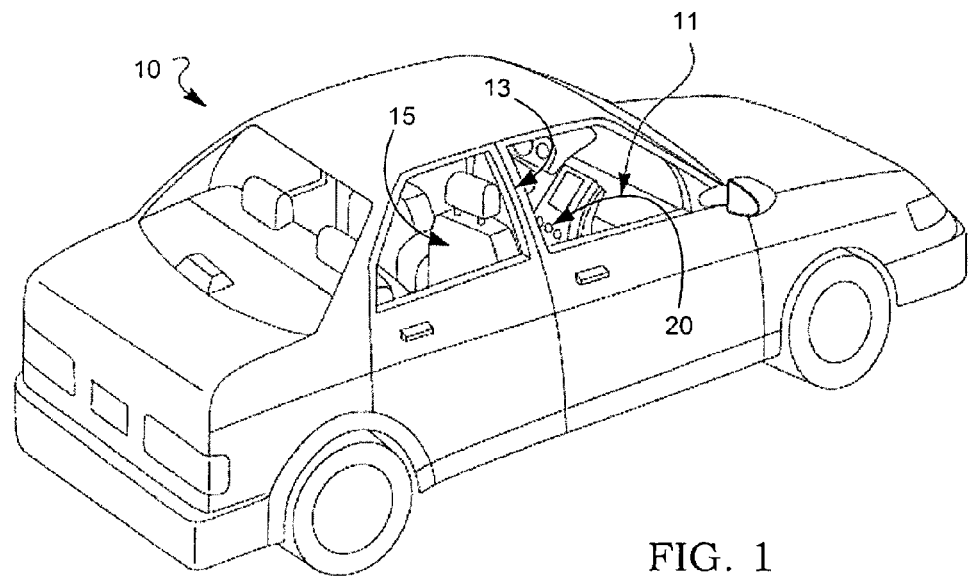
FIG. 1 is a perspective view of an exemplary embodiment of a motor vehicle.
Figure 2:
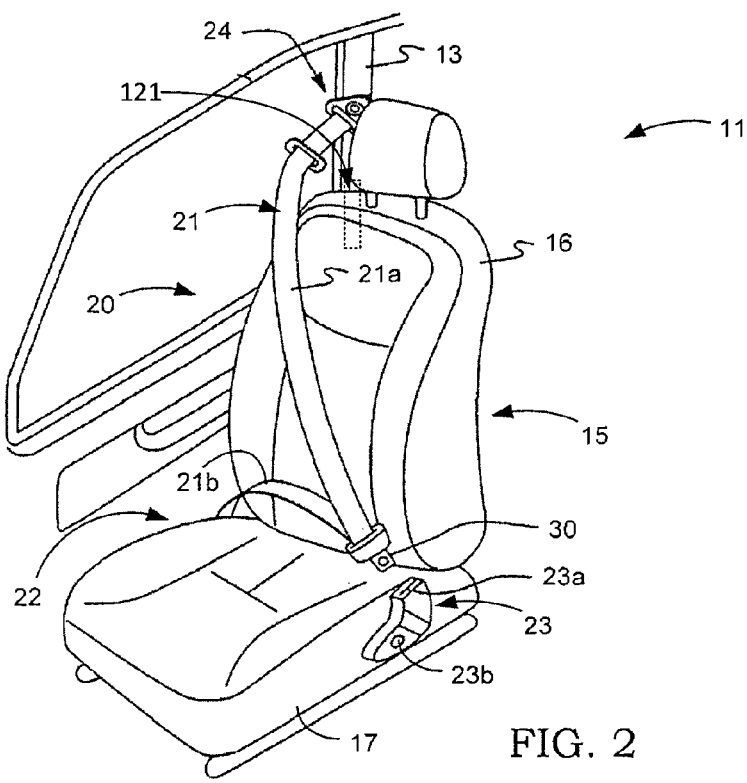
FIG. 2 is a perspective view of an exemplary embodiment of an occupant restraint system for providing restraint to an occupant of a seat system provided in the passenger compartment of a motor vehicle, such as the motor vehicle of FIG. 1.
Figure 3:
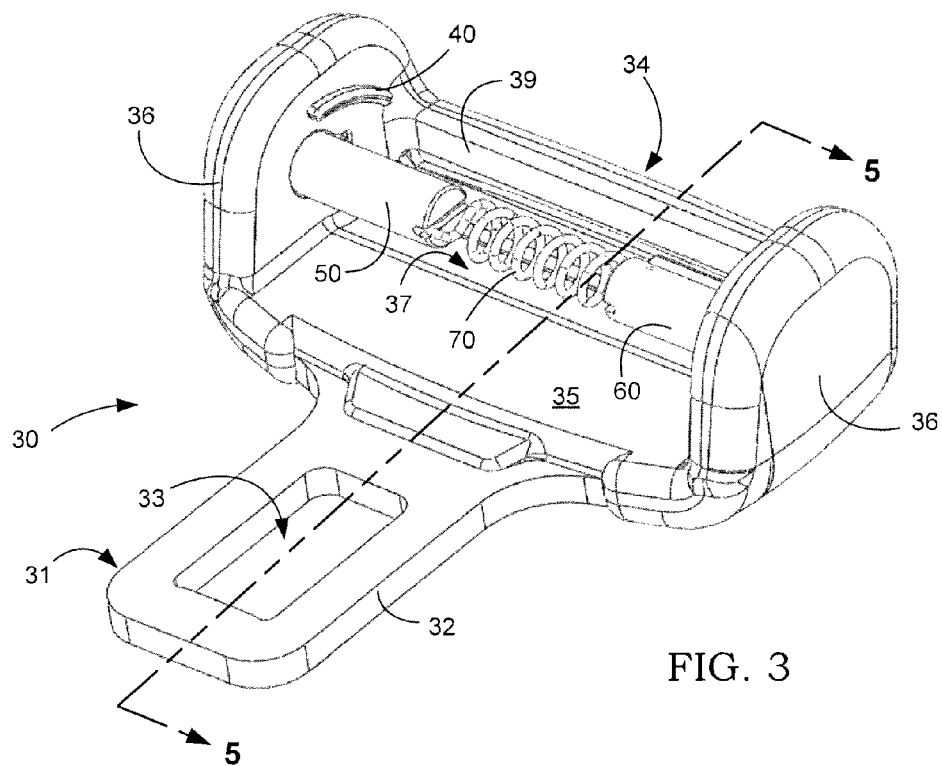
FIG. 3 is a perspective view of an exemplary embodiment of tongue assembly for use within an occupant restraint system, such as the occupant restraint system of FIG. 2.
Figure 4:
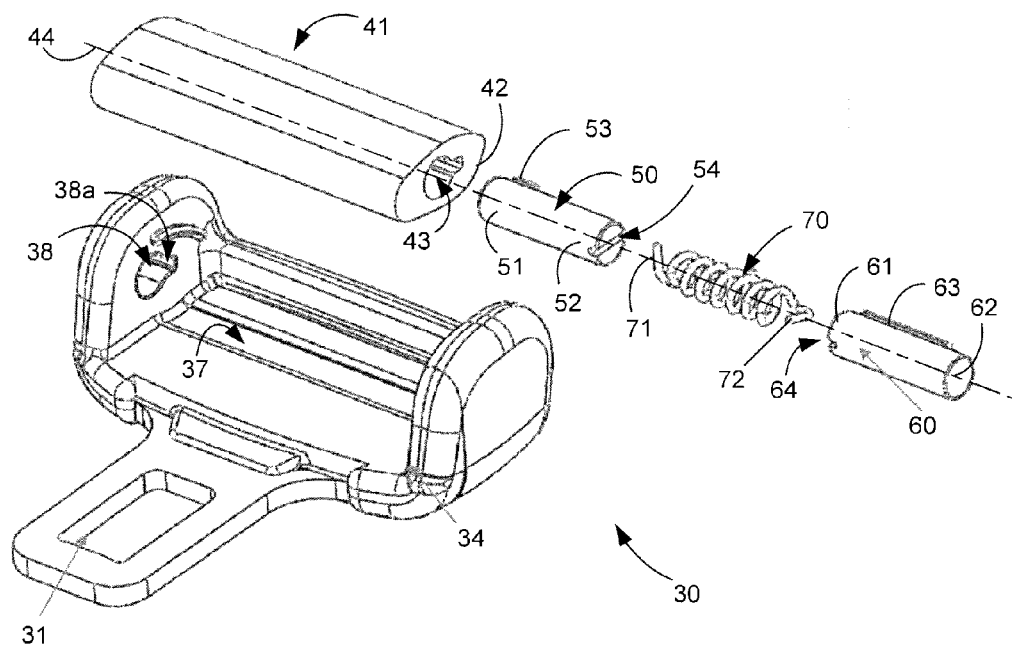
FIG. 4 is an exploded perspective view of the tongue assembly of FIG. 3.

As shown in FIGS. 1 and 2, an exemplary embodiment of a motor vehicle 10 is illustrated to include a passenger compartment 11 having a seat system 15 configured to provide seating to an occupant (not shown) and an active occupant restraint system (or seat belt system) 20 to provide active restraint to the seated occupant. The seat system 15 may include a seat back 16 and a seat bottom 17. The occupant restraint system 20 may be configured to couple to the vehicle, such as to the b-pillar 13 or to the floor (not shown); to the seat system 15, such as to the seat bottom 17; or to a combination of the vehicle and the seat system. The occupant restraint systems, as disclosed herein, may be configured for use with any seat system (e.g., driver-side, passenger-side, second row, third row, etc.) to retain any vehicle occupant. Additionally, the occupant restraint systems disclosed herein may be used within any vehicle, such as a truck, an SUV, a boat, and/or a commercial vehicle.

According to an exemplary embodiment, the active occupant restraint system is integrated into the seat system, which is to say the occupant restraint system couples directly to the seat assembly. According to another exemplary embodiment, the occupant restraint system operates independent of the seat system, which is to say the occupant restraint system couples directly to vehicle components other than the seat system. According to yet another exemplary embodiment, the occupant restraint system is partially integrated and partially independent of the seat system, which is to say the occupant restraint system couples directly to both the seat system and vehicle components other than the seat system. The occupant safety systems disclosed herein may be configured for use in any motor vehicle using any suitable configuration, and the illustrations herein should not be considered as limitations.

FIG. 2 illustrates an exemplary embodiment of an active occupant restraint system 20 that is partially integrated and partially independent to the seat system 15. According to an exemplary embodiment, the occupant restraint system 20 includes a seat belt webbing 21, a buckle mechanism 23, and a tongue assembly 30 configured to selectively engage the buckle mechanism 23. The occupant restraint system 20 may further include a conventional retractor mechanism 121 for providing retraction and/or to pretension the webbing 21, a D-ring 24 for guiding the webbing 21, and/or an anchor member 22 for anchoring or fixing the webbing 21. An exemplary embodiment of a retractor mechanism is disclosed in U.S. Pat. No. 6,499,554 to Yano et al., however, the retractor mechanism may be configured using any known method or any future method hereafter developed. The D-ring and the anchor member may also be configured using any known method or any future method hereafter developed.

The seat belt webbing 21 may be made from any suitable material (e.g., flexible woven nylon mesh) to include a first end and a second end. According to an exemplary embodiment, the first end of the webbing 21 couples to the retractor mechanism 121. According to other embodiments, the first end of the webbing may couple to the vehicle, to the seat system, to any pretensioning device, or to any other suitable component. According to an exemplary embodiment, the second end of the webbing 21 couples to the anchor member 22. According to other embodiments, the second end of the webbing may couple to the vehicle, to the seat system, to any pretensioning device, or to any other suitable component. Between the first and second ends, the webbing 21 may route through the D-ring 24 and the tongue assembly 30, such that the tongue assembly 30 may selectively slide along the length of the webbing 21.

According to an exemplary embodiment, the webbing 21 includes a first (or shoulder) portion 21a and a second (or lap) portion 21b. The shoulder portion 21a may be configured to extend between the D-ring 24 and the tongue assembly 30, whereby the shoulder portion 21a routes over the shoulder of the occupant to provide active restraint to the occupant by restraining the chest or thorax of the occupant during a vehicle dynamic event (e.g., a frontal impact). The lap portion 21b may be configured to extend between the tongue assembly 30 and the anchor member 22, whereby the lap portion 21b routes over the lap of the occupant to provide restraint to the occupant by restraining the abdomen and waist of the occupant during a vehicle dynamic event.

The buckle mechanism 23 may be configured to selectively receive and connect to the tongue assembly 30. The buckle mechanism 23 may include an opening 23a configured to receive a portion (e.g., latch plate) of the tongue assembly 30, a locking mechanism configured to lock the portion of the tongue assembly 30 to the buckle mechanism 23, and a button (or release) 23b configured to release the tongue assembly 30 from the buckle mechanism 23 when depressed or activated. The buckle mechanism 23 may be configured using any known method or any future method hereafter developed.

FIGS. 3-6 illustrate an exemplary embodiment of a tongue assembly 30 for use within the occupant restraint system 20. According to an exemplary embodiment, the tongue assembly 30 includes a tongue member 31 configured to selectively engage the buckle mechanism 23, a body 34 provided around at least a portion of the tongue member 31, a cam 41 having a cam surface 42, a fixed pin 50, a pivot pin 60, and a biasing member (or spring) 70. The cam 41 may include an opening 43 configured to receive at least a portion of the fixed pin 50, the spring 70, and at least a portion of the pivot pin 60. At least a portion of both the fixed pin 50 and pivot pin 60 may be configured to engage the body 34 of the tongue assembly 30. The cam 41 and the pivot pin 60 may rotate about an axis of rotation 44 between a first free (or open cam) position that is configured to allow the tongue assembly 30 to slide freely along the webbing 21 and a second closed (or locking cam) position that is configured to lock the tongue assembly 30 to a clamped portion of the webbing 21 (i.e., the tongue assembly 30 is prohibited from sliding freely along the webbing 21).

Figure 5:
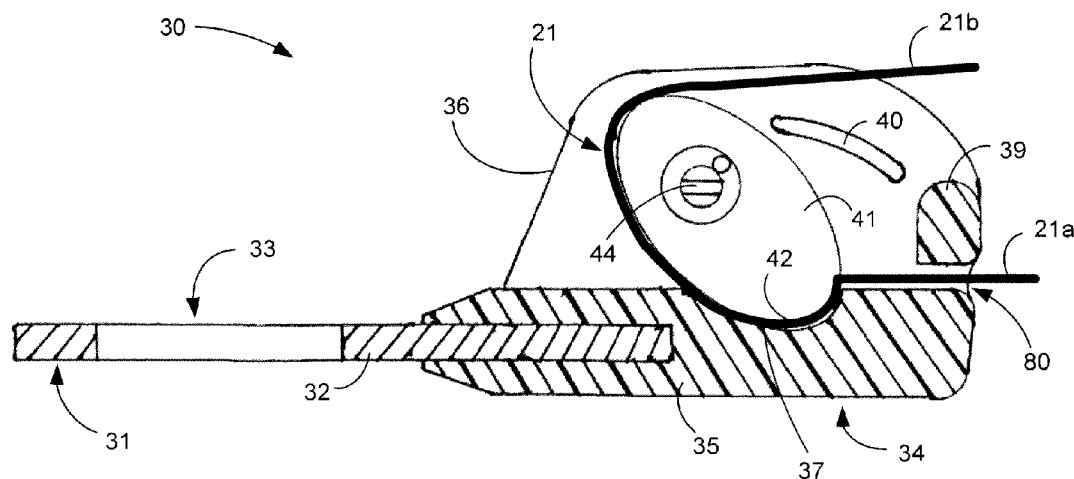
FIG. 5 is a cross-sectional view of the tongue assembly of FIG. 3 with the cam securing or clamping the webbing, thereby prohibiting sliding of the tongue assembly along the length of the webbing.

The tongue member 31 may be (or include) a latch plate 32 made from steel or any suitable material strong enough to withstand the forces exerted through the latch plate 32 during restraint of an occupant by the occupant restraint system 20 during an event, such as a rapid vehicle deceleration. The latch plate 32 may have a rectangular shaped first end with an opening 33 that is configured to selectively engage the buckle mechanism 23. The latch plate 32 may have a relatively larger rectangular shaped second end that is configured to be enclosed (at least partially) by the body 34 of the tongue assembly 30, as shown in FIG. 5.

The body 34 may be made from a polymeric material, composite material, or any suitable material that is strong enough to withstand the forces of restraining an occupant, and may be made by over-molding the polymeric material around at least a portion of the tongue member 31. According to an exemplary embodiment, the body 34 includes a base 35 that is provided around the tongue member 31, and two opposing side walls 36 that extend from the base 35. The base 35 may include a contact surface 37 that may be configured having a shape that is similar to (or unique from) the profile of the cam surface 42 on the cam 41, whereby the cam surface 42 of the cam 41 may clamp (or restrain or secure or bind) a portion of the webbing 21 to the contact surface 37 of the body 34 of the tongue assembly 30.

The wall 36 of the body 34 may include a bore 38 that is configured to receive a pin. According to an exemplary embodiment, the first wall 36 includes a first bore 38 that extends from the inside surface of the wall 36 a distance that is less than (or equal to) the depth of the wall 36, and is configured to receive the fixed pin 50, and the second wall 36 includes a second bore (not shown) that is configured to receive the pivot pin 60. The first bore 38 may be configured to receive an end of the fixed pin 50 that is similarly shaped. For example, the first bore 38 may be substantially round with a rectangular shaped anti-rotation feature 38a, whereby the fixed pin 50 has at least one end that is similarly shaped, thereby to prevent relative rotation about the axis of rotation 44 between the body 34 and the fixed pin 50. The second bore may be configured to receive an end of the pivot pin 60 that is similarly shaped. For example, the second bore 38 may be round, whereby the pivot pin 60 has at least one end that is similarly shaped to permit rotation of the pivot pin 60 about the axis of rotation relative to the body 34.

Figure 6:
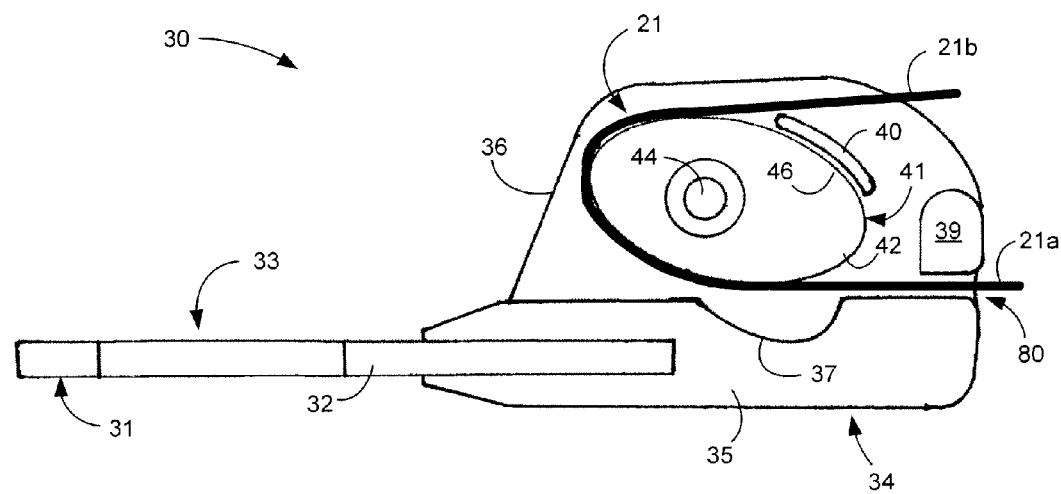
FIG. 6 is a cross-sectional view of the tongue assembly of FIG. 3 with the webbing unsecured by the cam, thereby allowing the tongue assembly to slide freely along the length of the webbing.

The body 34 may also include a rear wall 39 that is configured to span the length (or extend) between the walls 36. The rear wall 39 may be offset a distance from the base 35 of the body 34 thereby creating a gap 80 between the rear wall 39 and base 35. The gap 80 may be configured to permit a portion of the webbing 21, such as the shoulder portion 21a, to pass therein. The body 34 may further include a stop 40 that is configured to limit angular rotation of the cam 41 about the axis of rotation 44. According to an exemplary embodiment, the stop 40 is configured as an arc shaped extrusion that extends from the inside surface of the wall 36, whereby the arc shaped stop 40 is provided in a location to limit angular rotation of the cam 41, as shown in FIG. 6.

According to an exemplary embodiment, the cam 41 is configured to pivot about the axis of rotation 44 between a first free (or open cam) position, whereby the tongue assembly 30 may slide freely along the length of the webbing 21, and a second closed (or locking cam) position, whereby the tongue assembly 30 may clamp onto (or secure) a portion of the webbing 21, such that the tongue assembly 30 is prohibited from sliding freely along the webbing 21. The cam 41 may be made from steel or any suitable material that is strong enough to withstand the forces necessary to clamp the webbing 21 while restraining an occupant. According to an exemplary embodiment, the cam 41 includes a cam surface 42 that is configured to clamp or secure the webbing 21, and an opening 43 that is configured substantially concentric to the axis of rotation 44. The cam surface 42 may be configured as an eccentric, offset a distance from the axis of rotation 44. The cam surface 42 may also be configured as an Archimedes spiral. The cam 41 may also include a stop surface 46 configured to contact the stop 40 of the body 34, thereby limiting the rotational travel of the cam 41, as shown in FIG. 6. The cam may also be configured to include a line of contact opposed to a surface of contact to a stop to limit the rotational travel of the cam.

The opening 43 of the cam 41 may be configured to receive at least a portion of the fixed pin 50, the spring 70, and at least a portion of the pivot pin 60. According to an exemplary embodiment, the opening 43 includes a semi-circular portion with a key-way (e.g., a square portion) that extends from the semi-circular portion, whereby the opening 43 is configured to allow the fixed pin 50, the spring 70, and the pivot pin 60 to enter the opening 43 from one end and pass through at least a portion of the cam 41, whereby a portion of the fixed pin 50 and a portion of the pivot pin 60 may extend beyond the two surfaces of the respective sides of the cam 41.

According to an exemplary embodiment, the fixed pin 50 has a substantially cylindrical body with a substantially circular cross section and is configured to be concentric to the axis of rotation 44. The fixed pin 50 may be configured to remain fixed rotationally relative to the body 34 of the tongue assembly 30, such that the cam 41 rotates about the axis of rotation 44 relative to the fixed pin 50. The fixed pin 50 may include a first end 51 having an anti-rotation feature 53 configured to engage the bore 38 of the first wall 36 of the body 34 of the tongue assembly 30, and a second end 52 configured to engage the spring 70. The bore 38 in the first wall 36 of the body 34 may be similarly shaped to prevent relative rotation between the body 34 and the fixed pin 50. According to an exemplary embodiment, the anti-rotation feature 53 of the first end 51 is configured as a rectangular shaped protrusion extending from the cylindrical portion, whereby the rectangular anti-rotation feature 53 is configured to pass within the opening 43 of the cam 41 to allow the fixed pin 50 to pass through the opening 43. The anti-rotation feature 53 may be configured to prohibit rotation of the fixed pin 50 relative to the body 34. The anti-rotation feature 53 may be configured to have a length that is contained within the bore 38 of the body 34, such that the circular portion of the fixed pin 50 engages the opening 43 of the cam 41 in order to allow the cam 41 to rotate relative to the fixed pin 50. The second end 52 of the fixed pin 50 may include a retaining feature 54 configured to receive and retain a first end 71 of the spring 70. According to an exemplary embodiment, the retaining feature 54 is configured as a slot that extends the width of the fixed pin 50, whereby the height and depth of the slot is tailored based on the size on the first end 71 of the spring 70.

According to an exemplary embodiment, the pivot pin 60 has a substantially cylindrical body with a substantially circular cross section and is configured to be substantially concentric to the axis of rotation 44. The pivot pin 60 may be rotationally coupled to the cam 41, such that the cam 41 and the pivot pin 60 rotate about the axis of rotation 44 together relative to the body 34 and the fixed pin 50. The pivot pin 60 may include a first end 61, a second end 62 configured to engage the bore in the second wall 36 of the body 34, and an anti-rotation feature 63 provided along the length of the pivot pin 60 between the first and second ends 61, 62. According to an exemplary embodiment, the anti-rotation feature 63 is configured as a rectangular shaped protrusion extending from the cylindrical portion of the pivot pin 60, whereby the rectangular anti-rotation feature 63 is configured to pass within the opening 43 of the cam 41 to allow the pivot pin 60 to pass through the opening 43. The anti-rotation feature 63 may be configured to prohibit rotation of the pivot pin 60 about the axis of rotation 44 relative to the cam 41. Thus, the pivot pin 60 may be configured to rotate with the cam 41. The anti-rotation feature 63 may be configured to have a length that is contained within the cam 41, thereby having a circular cross-section that engages the circular bore 38 (opposite the bore 38 in the first wall 36 that is engaged by the fixed pin 50) in the second wall 36 of the body 34, such that the pivot pin 60 may rotate relative to the body 34. The first end 61 of the pivot pin 60 may include a retaining feature 64 configured to receive and retain a second end 72 of the spring 70. According to an exemplary embodiment, the retaining feature 64 is configured as a slot that extends the width of the pivot pin 60, whereby the height and depth of the slot is tailored based on the size on the second end 72 of the spring 70.

According to an exemplary embodiment, the biasing member (or spring) 70 is configured as a coil spring having a first end 71 and a second end 72. The coil spring 70 may be configured to compress (i.e., shorten in length along the axis of rotation 44) when a compression force is applied in the axial direction from one end or both ends. The coil spring 70 may also be configured to provide rotationally stored energy (e.g., energy in torsion), such as to provide rotation of the cam 41 and the pivot pin 60. According to an exemplary embodiment, the first end 71 of the spring 70 may engage the retaining feature 54 of the fixed pin 50, and the second end 72 of the spring 70 may engage the retaining feature 64 of the pivot pin 60, thereby providing energy in torsion, which rotates the pivot pin 60 (and the cam 41 accordingly) relative to the fixed pin 50 and the body 34.

During assembly of the tongue assembly 30, the fixed pin 50, spring 70 and pivot pin 60 may be inserted into the opening 43 of the cam 41, whereby the total width of the pins 50, 60 with the spring 70 in the free (i.e., non-compressed) state is wider than the width of the cam 41, as well as the width between the inside surfaces of the walls 36 of the body 34. Then, force may be applied to the first end 51 of the fixed pin 50 and/or the second end 62 of the pivot pin 60, thereby compressing the spring 70 in the direction along the axis of rotation 44 storing compression energy therein and reducing the width of the spring 70 and the total width from the edge surface of the first end 51 of the fixed pin 50 to the edge surface of the second end 62 of the pivot pin 60, so that the width is less than the total width between the inside surfaces of the walls 36 of the body 34. Then, the fixed pin 50 may be positioned substantially concentric to the bore 38 in the first wall 36 of the body 34, and the pivot pin 60 may be placed positioned substantially concentric to the bore 38 in the second wall 36 of the body 34. When the compression forces are removed, the stored compression energy in the spring 70 increase the width of the spring 70, thereby driving the first end 51 of the fixed pin 50 into engagement with the bore 38 (provided the anti-rotation features are aligned) of the first wall 36 of the body 34, and driving the second end 62 of the pivot pin 60 into engagement with the bore 38 of the second wall 36 of the body 34. Thus, the body 34 retains the cam 41, the fixed pin 50, the pivot pin 60 and the spring 70.

The tongue assembly 30 is shown in FIG. 5 configured in the second closed (or locking cam) position, whereby a portion of the webbing 21 is clamped or secured between the cam surface 42 of the cam 41 and the contact surface 37 of the body 34, thereby prohibiting the tongue assembly 30 from sliding freely along the length of the webbing 21. The tongue assembly 30 is shown in FIG. 6 configured in the first free (or open cam) position, whereby the tongue assembly 30 is allowed to slide freely along the length of the webbing 21.

According to an exemplary embodiment, the spring 70 may be configured to provide energy in torsion (or rotational force or torque) to the cam 41, thereby rotating the cam 41 to the open cam position (as shown in FIG. 6). During normal vehicle use, the webbing 21 remains unclamped or unsecured by the cam 41, thereby allowing the tongue assembly 30 to freely slide along the length of the webbing 21. When provided in this configuration, the tongue assembly 30 may be adjusted freely along the webbing 21, such as to improve comfort. When the vehicle is subjected to a sudden deceleration, then the cam 41 may be configured to rotate into the closed or locking position (as shown in FIG. 5). According to an exemplary embodiment, the cam 41 may be configured with an inertia whereby the force generated by the decelerating vehicle induces the cam to rotate into the closed position and clamps or binds a portion of the webbing 21 in place between the cam 41 and the contact surface 37 of the cam 41. The tongue assembly 30 may be configured to clamp or secure the webbing 21 until the force is removed, which may be induced by the vehicle coming to rest or having a relative small deceleration.

Figure 7:
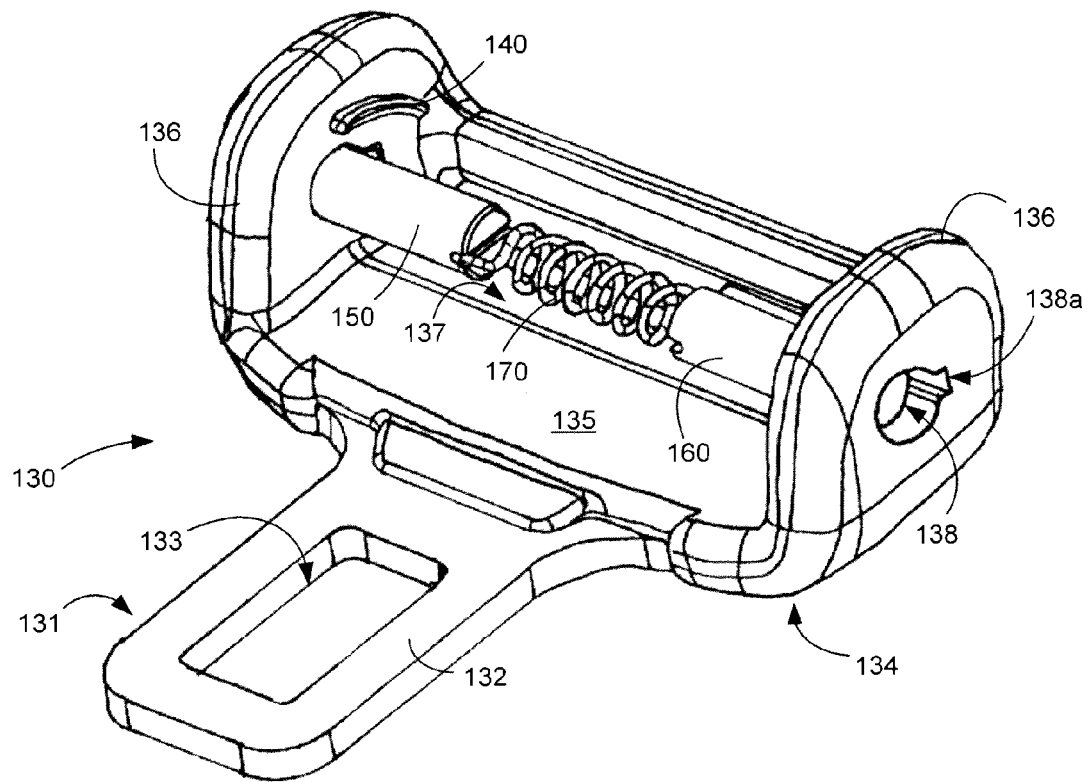
FIG. 7 is a perspective view of another exemplary embodiment of a tongue assembly for use within an occupant restraint system, such as the occupant restraint system of FIG. 2.
Figure 8:
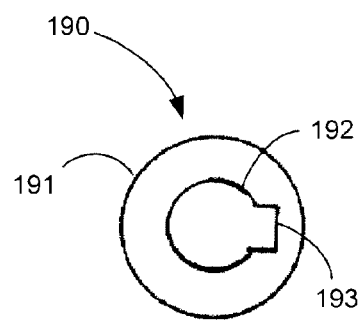
FIG. 8 is a front view of an exemplary embodiment of a cap for use within a tongue assembly, such as the tongue assembly of FIG. 7.
Figure 9:
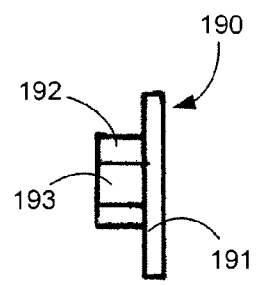
FIG. 9 is a side view of the cap of FIG. 8.

FIGS. 7-9 illustrate another exemplary embodiment of a tongue assembly 130 for use within an occupant restraint system, such as the occupant restraint system 20. The tongue assembly 130 includes a tongue member 131 configured to selectively engage the buckle mechanism 23, a body 134 provided around at least a portion of the tongue member 131, a cam (not shown for clarity), a fixed pin 150, a pivot pin 160, and a biasing member (or spring) 170. The cam may be configured to receive at least a portion of the fixed pin 150, the spring 170, and at least a portion of the pivot pin 160. At least a portion of both the fixed pin 150 and pivot pin 160 may be configured to engage the body 134 (e.g., the walls 136) of the tongue assembly 130. The cam and the pivot pin 160 may rotate about an axis of rotation between a first free (or open cam) position that is configured to allow the tongue assembly 130 to slide freely along the webbing 21 and a second closed (or locking cam) position that is configured to lock the tongue assembly 130 to a clamped portion of the webbing 21 (i.e., the tongue assembly 130 is prohibited from sliding freely along the webbing 21).

The tongue member 131 may be (or include) a latch plate 132 with an opening 133 that is configured to selectively engage the buckle mechanism 23. The latch plate 132 may have a relatively larger rectangular shaped second end that is configured to be enclosed (at least partially) by the body 134 of the tongue assembly 130. The body 134 may include a base 135 that is provided around a portion of the tongue member 131, and two opposing side walls 136 that extend from the base 135. The base 135 may include a contact surface 137 that may be configured having a shape that is similar to (or unique from) the profile of the cam surface on the cam, whereby the cam may clamp (or restrain or bind or secure) the webbing 21 to the contact surface of the body 134 of the tongue assembly 130. The first wall 136 of the body 134 may include a bore 38 that is configured to receive at least a portion of the fixed pin 150. The second wall 136 includes an opening 138 that extends through the wall 136, whereby the opening 138 is configured to allow the fixed pin 150, the spring 170 and the pivot pin 160 to pass therethrough. The first bore 38 may be configured to receive an end of the fixed pin 150 that is similarly shaped. The opening 138 may include a substantially round portion and a rectangular portion 138a. The body 134 may further include a stop 140 that is configured to limit angular rotation of the cam about the axis of rotation. According to an exemplary embodiment, the stop 140 is configured as an arc shaped extrusion that extends from the inside surface of the first wall 136, whereby the arc shaped stop 140 is provided in a location to limit angular rotation of the cam.

During assembly of the tongue assembly 130, the fixed pin 150, spring 170 and pivot pin 160 may be inserted into the opening 138 of the second wall 136 of the body 134 from outside the wall 136, whereby the fixed pin 150 and spring 170 pass through the opening 138, and whereby at least a portion of the pivot pin 160 may pass through the opening 138 and a portion may remain provided therein. The fixed pin 150 may be positioned substantially concentric to the bore in the first wall 136 of the body 134, and the pivot pin 160 may be positioned substantially concentric to the opening 138 in the second wall 136. The spring 170 may be provided between the fixed pin 150 and the pivot pin 160, with one end of the spring 170 engaging the fixed pin 150 and the other end engaging the pivot pin 160 to generate torsion between the pins.

The tongue assembly 130 may include a cap 190 configured to engage at least a portion of the opening 138 in the second wall 136 to prohibit the pivot pin 160 from passing back out through the opening 138, thereby retaining the pins 150, 160 and spring 170 in position. The configuration of the cap 190 may vary and may, preferably, be tailored to be similar to the opening 138. According to an exemplary embodiment, the cap 190 includes a base 191, a cylindrical protruded portion 192 and a rectangular protruded portion 193. The base 191 may be cylindrical and configured larger than the opening 138, thereby contacting the wall 136. The protruded portions 192, 193 may be configured to engage the opening 138. The length of the protruded portions 192, 193 may determine the length of the pivot pin 160 that engages the remaining portion of the opening 138. The cap 190 may be connected to the tongue assembly 130 using any suitable method (e.g., heat-staked, sonic welded, fastened, adhesive, etc.).

Figure 10:
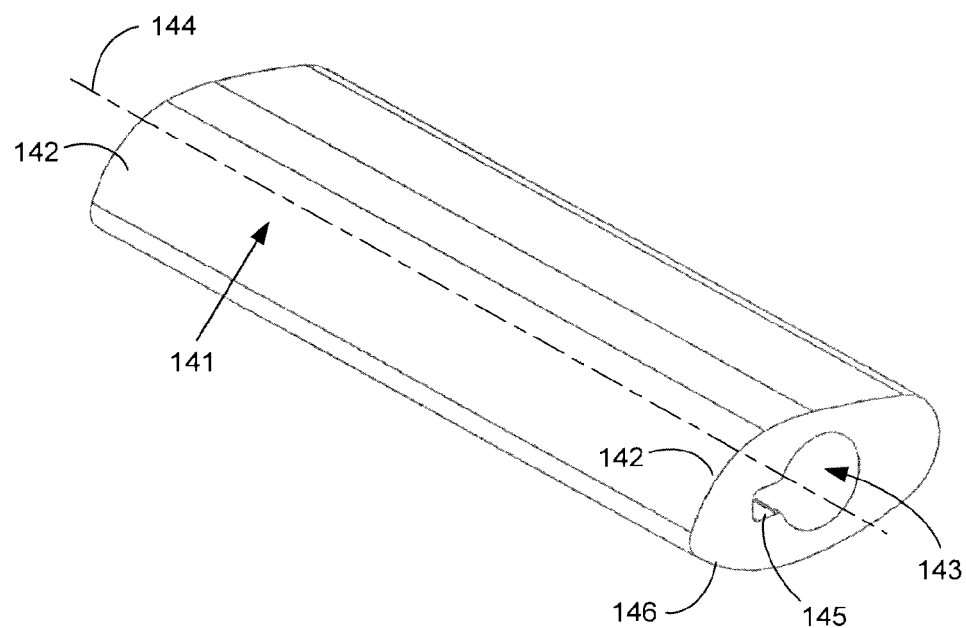
FIG. 10 is a perspective view of an exemplary embodiment of a cam for use within a tongue assembly, such as the tongue assembly of FIG. 7
Figure 11:
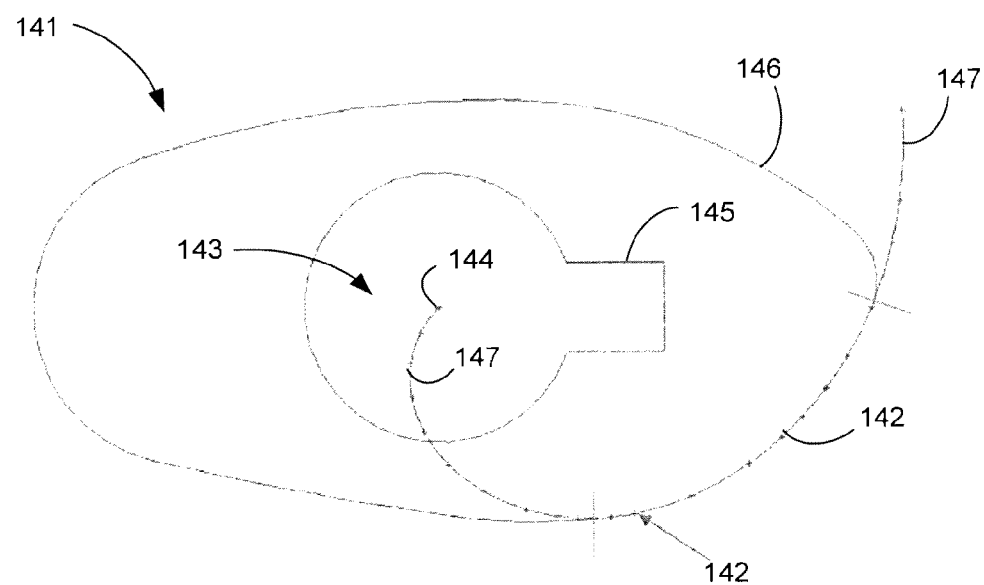
FIG. 11 is a side view of the cam of FIG. 10.

FIGS. 10 and 11 illustrate another exemplary embodiment of a cam 141 configured for use within a tongue assembly, such as the tongue assembly 130. According to an exemplary embodiment, the cam 141 is configured to pivot about an axis of rotation 144 to provide camming by a cam surface 142. The cam 141 may rotate to provide a clamp force from the cam surface 142 onto the webbing of the occupant restraint system to prohibit relative motion of the tongue assembly 130 along the length of the webbing. The cam 141 may also rotate out of engagement with the webbing to allow relative motion of the tongue assembly 130 along the length of the webbing. The cam 141 may be made from steel or any suitable material that is strong enough to withstand the forces necessary to clamp the webbing while restraining an occupant. The cam 141 may further include an opening 143 configured substantially concentric to the axis of rotation 144 and a stop surface 146 configured to contact the stop 140 of the body 134 to limit rotational travel of the cam 141.

The opening 143 may be configured to receive at least a portion of the fixed pin 150, the spring 170, and at least a portion of the pivot pin 160. The opening 143 may be semi-circular in shape with an extruded portion 145 that extends from the semi-circular portion to allow the fixed pin 150, the spring 170, and the pivot pin 160 to enter the opening 143 from one end and pass through the cam 141. The extruded portion 145 may be rectangular in shape or may be configured using any suitable shape, and is, preferably, configured similar to the anti-rotation features of the pins. The opening 143 may be configured to extend the entire length of the cam.

According to an exemplary embodiment, the cam surface 142 is configured to be at least a portion of an Archimedes spiral 147 that extends from the axis of rotation 144, as shown in FIG. 11. The use of the Archimedes spiral 147 as the shape (or profile) of the cam surface 142 that clamps the webbing of the occupant restraint system allows the gap between the cam and the contact surface 137 of the body 134 to be closed at a constant rate and evenly over a relative larger surface area. The cam 141 having the Archimedes spiral 147 shaped cam surface 142 allows for a surface area of contact instead of a line of contact that may result with other cam shapes. The increase area of contact allows for a reduced pressure on the webbing, even with large clamp forces being applied, thereby reducing the likelihood of damage to the webbing.

The tongue assemblies disclosed herein provide selective clamping of the webbing that passes through the tongue assembly, and allows for the spring force to be easily tailored to accommodate varying customer requirements. The tongue assemblies disclosed herein provide a relative smaller package size and lighter weight locking tongues compared to other tongue assemblies that provide selective clamping of the webbing. The tongue assemblies disclosed herein include fewer components, allow for a shorter assembly time, and provide a relative tamper resistant configuration when compared to other tongue assemblies. The tongue assemblies are also relatively resistant from abuse, such as being slammed in the door of the car, due to the positive engagement of the components.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the occupant restraint systems and tongue assemblies as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A tongue assembly for use in an occupant restraint system of a vehicle, the occupant restraint system also having a buckle mechanism and a webbing, comprising:
    a tongue member having an opening and configured to selectively engage the buckle mechanism of the occupant restraint system;
    a body formed over a portion of the tongue member;
    wherein the body includes a contact surface, a first wall, and a second wall opposing the first wall;
    a cam provided between the first and second walls of the body, and configured to rotate about an axis of rotation between a first locking position and a second free position;
    wherein the cam includes a cam surface; and
    a biasing member configured to rotationally bias the cam;
    wherein when the cam is positioned in the second free position the tongue assembly is free to slide along the length of the webbing of the occupant restraint system, and when the cam is positioned in the first locking position a portion of the webbing is clamped between the cam surface of the cam and the contact surface of the body thereby preventing the tongue assembly from sliding along the length of the webbing,
    wherein the first wall includes a first bore and the second wall includes a second bore opposing the first bore, and
    a fixed pin having a first end configured to engage the first bore such that the fixed pin is prohibited from rotating relative to the body, and a second end configured to receive a portion of the biasing member.

2. The tongue assembly of claim 1, further comprising a pivot pin having a first end configured to receive a portion of the biasing member, and a second end configured to engage the second bore such that the pivot pin is free to rotate relative to the body.

3. The tongue assembly of claim 2, wherein the biasing member is configured to engage the first end of the pivot pin and the second end of the fixed pin, thereby imparting energy in torsion between the fixed and pivot pins.

4. The tongue assembly of claim 2, wherein the cam includes an opening configured to receive at least a portion of the fixed pin, the pivot pin, and the biasing member.

5. The tongue assembly of claim 4, wherein the pivot pin includes an anti-rotation feature that prohibits relative rotation between the cam and the pivot pin, thereby enabling the cam and pivot pin to rotate together about the axis of rotation.

6. The tongue assembly of claim 1, wherein the first end of the fixed pin includes an anti-rotation feature to prohibit the fixed pin from rotating relative to the body.

7. The tongue assembly of claim 1, wherein the body includes a stop configured to limit the rotational travel of the cam.

8. The tongue assembly of claim 1, wherein the body includes a rear wall that extends between the two opposing walls, thereby forming a gap between the rear wall and the body to allow a portion of the webbing to pass therein.

9. The tongue assembly of claim 1, wherein the second bore is configured to allow the fixed pin, biasing member, and the pivot pin to pass therethrough.

10. The tongue assembly of claim 9, further comprising a cap that is configured to prevent the fixed pin, biasing member, and the pivot pin from passing back through the opening in the second wall.

11. The tongue assembly of claim 1, wherein the cam surface of the cam is configured as an Archimedes spiral.

12. A cam for use within a tongue assembly of an occupant restraint system having a buckle mechanism and a webbing, the tongue assembly being configured to selectively engage the buckle mechanism of the occupant restraint system, and the tongue assembly being configured to selectively clamp the webbing thereby to prevent the tongue assembly from sliding along the length of the webbing, comprising:
    a cam surface for contacting the webbing to selectively clamp the webbing to the tongue assembly to prevent the tongue assembly from sliding along the length of the webbing; and
    an axis of rotation, about which the cam rotates relative to the tongue assembly in order to selectively clamp the webbing,
    wherein the cam surface of the cam is configured as an Archimedes spiral.

13. An occupant restraint system configured to selectively restrain a seated occupant of a vehicle, comprising:
    a webbing having a first end connected to an anchor, and a second end;
    a buckle mechanism having an opening and a release; and
    a tongue assembly configured to selectively slide along the length of the webbing between the first and second ends of the webbing;
    wherein the tongue assembly includes a latch plate configured to pass through the opening of the buckle mechanism to selectively engage the buckle mechanism, thereby locking the tongue assembly to the buckle mechanism;
    wherein upon activation of the release of the buckle mechanism releases the latch plate thereby disengaging the tongue assembly from the buckle mechanism;
    wherein the tongue assembly also includes a cam configured to rotate about an axis of rotation to selectively clamp a portion of the webbing between the cam and the tongue assembly, thereby preventing the tongue assembly from sliding along the length of the webbing,
    wherein the tongue assembly includes a pivot pin configured to engage the cam, whereby the cam and pivot pin rotate together relative to the tongue assembly,
    wherein the tongue assembly also includes a body formed over a portion of the latch plate and having a first wall with a first bore and a second opposing wall with a second bore, whereby a portion of the pivot pin engages the second bore.

14. The occupant restraint system of claim 13, wherein the second end of the webbing is retractably connected to a retractor mechanism configured to pretension the webbing.

15. The occupant restraint system of claim 13, wherein the tongue assembly also includes a biasing member to provide energy in torsion to rotate the cam and pivot pin.

16. The occupant restraint system of claim 13, wherein the tongue assembly also includes a fixed pin configured to engage the first bore, wherein the cam rotates relative to the fixed pin.

17. The occupant restraint system of claim 16, wherein the cam includes an opening configured to receive at least a portion of the fixed pin, pivot pin and biasing member.

* * * * *